(12) United States Patent
Masuda

(10) Patent No.: US 8,295,875 B2
(45) Date of Patent: Oct. 23, 2012

(54) APPARATUS AND METHOD FOR MOBILE COMMUNICATION BY USING NON-VOLATILE MEMORY DEVICE

(75) Inventor: Kazuhiro Masuda, Tokyo (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 1376 days.

(21) Appl. No.: 11/941,230

(22) Filed: Nov. 16, 2007

(65) Prior Publication Data
US 2008/0125170 A1 May 29, 2008

(30) Foreign Application Priority Data

Nov. 28, 2006 (JP) ................................. 2006-320196

(51) Int. Cl.
*H04M 1/00* (2006.01)
(52) U.S. Cl. .................. 455/550.1; 455/556.1; 455/418; 455/419; 711/170; 711/103
(58) Field of Classification Search .................. 711/170, 711/202, 210, 100–106; 455/550.1, 556.1, 455/418

See application file for complete search history.

(56) References Cited

U.S. PATENT DOCUMENTS

| | | | |
|---|---|---|---|
| 6,456,841 B1* | 9/2002 | Tomimori | 455/412.2 |
| 6,910,213 B1 | 6/2005 | Hirono et al. | |
| 7,200,741 B1 | 4/2007 | Mine | |
| 2006/0161728 A1* | 7/2006 | Bennett et al. | 711/103 |
| 2008/0082728 A1* | 4/2008 | Traister et al. | 711/103 |
| 2009/0272251 A1* | 11/2009 | Georges et al. | 84/609 |

FOREIGN PATENT DOCUMENTS

| | | |
|---|---|---|
| JP | 2001-147902 A | 5/2001 |
| JP | 2001-236071 A | 8/2001 |
| JP | 2002-318714 A | 10/2002 |
| JP | 2002-366432 A | 12/2002 |
| JP | 2005-020540 A | 1/2005 |
| JP | 2006-172495 A | 6/2006 |

OTHER PUBLICATIONS

Japanese Office Action mailed Mar. 8, 2011 as received in related application No. 2006-320196.

* cited by examiner

*Primary Examiner* — Dwayne Bost
*Assistant Examiner* — Neda Behrooz
(74) *Attorney, Agent, or Firm* — Maschoff Gilmore & Israelsen

(57) ABSTRACT

A mobile communication apparatus configured to communicate with an opposite communication device is provided. The mobile communication apparatus includes a transceiver configured to receive an incoming signal sent from the opposite communication device. The transceiver is configured to produce an interrupt signal upon receiving the incoming signal. The mobile communication apparatus includes a first memory device and a non-volatile second memory device. The mobile communication apparatus includes a controller connected to the transceiver, the first memory device and the second memory device. The controller is configured to perform garbage collection of the second memory device, to load data stored in one of the first memory device and the second memory device into another of the first memory device and the second memory device, to access the first memory device if the transceiver produces the interrupt signal.

6 Claims, 3 Drawing Sheets

APPARATUS AND METHOD FOR MOBILE COMMUNICATION BY USING NON-VOLATILE MEMORY DEVICE

CROSS REFERENCE TO RELATED APPLICATIONS

This application is based upon and claims the benefit of priority from the prior Japanese Patent Application No. 2006-320196 filed on Nov. 28, 2006 the entire contents of which are incorporated herein by reference.

BACKGROUND OF THE INVENTION

1. Field of the Invention

The present invention relates to an apparatus and a method for mobile communication by using a non-volatile memory device, and in particular for avoiding a conflict occurring in the non-volatile memory device.

2. Description of the Related Art

Fragmentation is a phenomenon that leads to inefficiency in many forms of data storage of computers and other electronic devices. A NAND-type flash memory device to be used for secondary storage, e.g., may be fragmented while continuously being used. In such a case, the NAND-type flash memory device may not have contiguous free storage of a significant size, but may have free regions of storage of varying sizes at intervals.

Assume, e.g., that a mobile communication apparatus capable of receiving television (TV) broadcast records a received TV program to a built-in NAND-type flash memory device. If the TV program data of high speed and large size are written to the NAND-type flash memory device which has been fragmented, some of the data may be unexpectedly lost due to a processing load being too heavy for the mobile communication apparatus as a processing system.

Thus, the NAND-type flash memory device needs defragmentation or garbage collection so as to solve the fragmentation. A defragmentation or garbage collection process may need a certain amount of time to be performed, though.

A communication apparatus (a mobile phone) configured to perform garbage collection without sacrificing operability is disclosed in Japanese Patent Publications of Unexamined Applications (Kokai), No. 2005-20540. More specifically, as disclosed in paragraphs 0013 and 0017 of JP 2005-20540, the mobile phone may perform garbage collection so as to reclaim unused regions of storage, to arrange the regions of storage in order and to form contiguous free storage while data files stored in a flash memory device are not being accessed.

The mobile phone of JP 2005-20540 performs garbage collection while no data files stored in the flash memory device are accessed and a user of the mobile phone is unaware of the garbage collection being performed, by taking advantage of characteristics of the mobile phone such as:
(1) while making a voice call;
(2) while processing a voice call arrival;
(3) during a voice call;
(4) while a folder is being closed in a case where the mobile phone is of a folder type;
(5) during a power-off process after power is turned off;
(6) during a power-on process after power is turned on;
(7) at a time, collectively, set by the user according to the user's way of use; or
(8) at a free time automatically determined based on data of sending and receiving voice calls and e-mails, e.g., stored for a last week.

By performing the garbage collection as described above, the mobile phone of JP 2005-20540 may immediately write data to the free storage of the flash memory device upon receiving a new e-mail.

The mobile phone of JP 2005-20540 has been devised so that a period of time in which a data file stored in the flash memory device is accessed and a period of time in which the garbage collection is performed do not conflict with each other. In a mobile communication apparatus such as a mobile phone, however, an interrupt may occur at a timing that the user does not expect such as, e.g., writing data of an e-mail to the flash memory device after the e-mail is received, reading a ring tone from the flash memory device to play back the ring tone after an e-mail or a voice call arrives, or writing message data left on a built-in answering machine function to the flash memory device after a voice call arrives.

One of the above interrupts, if occurring while the mobile phone is performing the garbage collection, conflicts with the garbage collection on the flash memory device. In such a case, there is a problem that the mobile phone more or less loses operability, as it is necessary to forbid one of the interrupt and the garbage collection.

SUMMARY OF THE INVENTION

Accordingly, an object of the present invention is to provide a mobile communication apparatus configured to ordinarily access storage while performing garbage collection without causing a problem.

To achieve the above object, according to one aspect of the present invention, a mobile communication apparatus configured to communicate with an opposite communication apparatus is provided. The mobile communication apparatus includes a transceiver configured to receive an incoming signal sent from the opposite communication apparatus. The transceiver is configured to produce an interrupt signal upon receiving the incoming signal. The mobile communication apparatus includes a first memory device and a non-volatile second memory device. The mobile communication apparatus includes a controller connected to the transceiver, the first memory device and the second memory device. The controller is configured to perform garbage collection of the second memory device, to load data stored in one of the first memory device and the second memory device into another of the first memory device and the second memory device, to access the first memory device if the transceiver produces the interrupt signal.

DETAILED DESCRIPTION OF THE INVENTION

Figure 1:
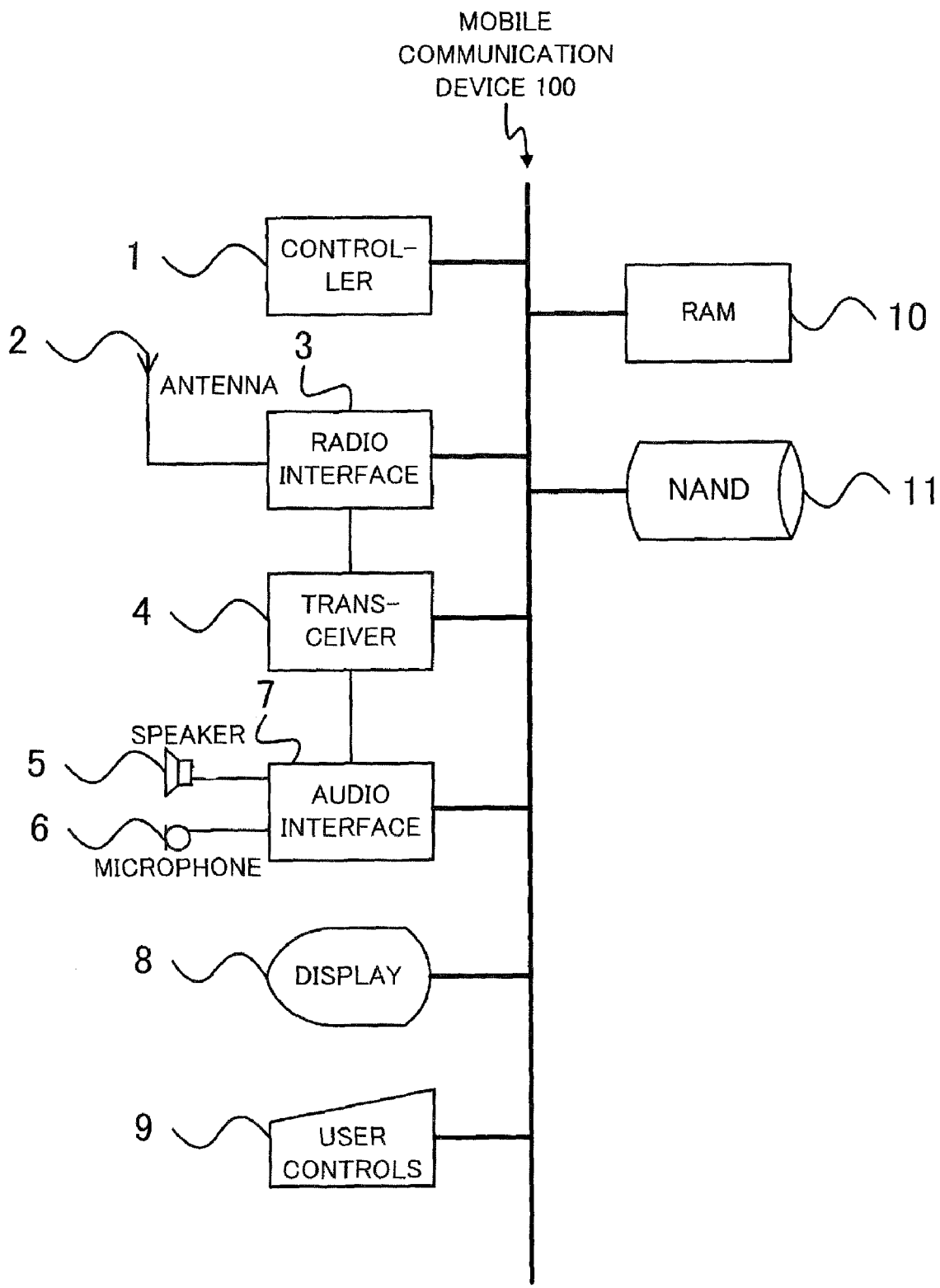
FIG. 1 is a block diagram of a main portion of a mobile communication apparatus of an embodiment of the present invention.

An embodiment of the present invention will be described with reference to FIGS. 1-3. FIG. 1 is a block diagram of a main portion of a mobile communication apparatus 100 of the embodiment. The mobile communication apparatus 100 has a controller 1, an antenna 2, a radio interface 3, a transceiver 4, a speaker 5, a microphone 6, an audio interface 7, a display 8, user controls 9, a random access memory device (RAM) 10, a NAND-type flash memory device 11 (shortened as NAND 11) and so on.

The controller 1 totally controls the mobile communication apparatus 100. The antenna 2 sends and receives radio waves to and from a base station (not shown) of a mobile communication network. The radio interface 3 provides the transceiver 4 with an incoming radio frequency (RF) signal received by the antenna 2, and provides the antenna 2 with an outgoing RF signal provided by the transceiver 4 so that the outgoing RF signal is emitted from the antenna 2.

The transceiver 4 amplifies, down-converts and demodulates the incoming RF signal provided by the radio interface 3, provides the audio interface 7 with a resultantly produced digital voice signal, and provides the controller 1 with a resultantly produced control signal. The transceiver 4 provides the controller 1 with an interrupt signal upon receiving a voice call arrival or an e-mail arrival.

The transceiver 4 modulates, up-converts and amplifies a digital voice signal provided by the audio interface 7 and a control signal provided by the controller 1, and provides the radio interface 3 with the outgoing RF signal thereby.

The speaker 5 may be used for producing voice of an incoming voice call and so on. The microphone 6 may be used for picking up voice of an outgoing voice call and so on.

The audio interface 7 converts the digital voice signal provided by the transceiver 4 into an analog voice signal, then amplifies and provides the speaker 5 with the analog voice signal for producing incoming voice. The audio interface 7 amplifies an analog voice signal provided by the microphone 6, converts the analog voice signal into a digital voice signal which will be provided to the transceiver 4.

The display 8 may be used for displaying various kinds of information, and is formed by, e.g., a liquid crystal display (LCD) device. The user controls 9 may be used for various kinds of key operation inputs.

The RAM 10 is a primary storage device for running programs. The NAND 11 is a secondary storage device formed by a non-volatile NAND-type flash memory device. The NAND 11 may be used for storing data of e-mails, ring tones, messages left on a built-in answering machine function of the mobile communication apparatus 100, and so on.

Figure 2:
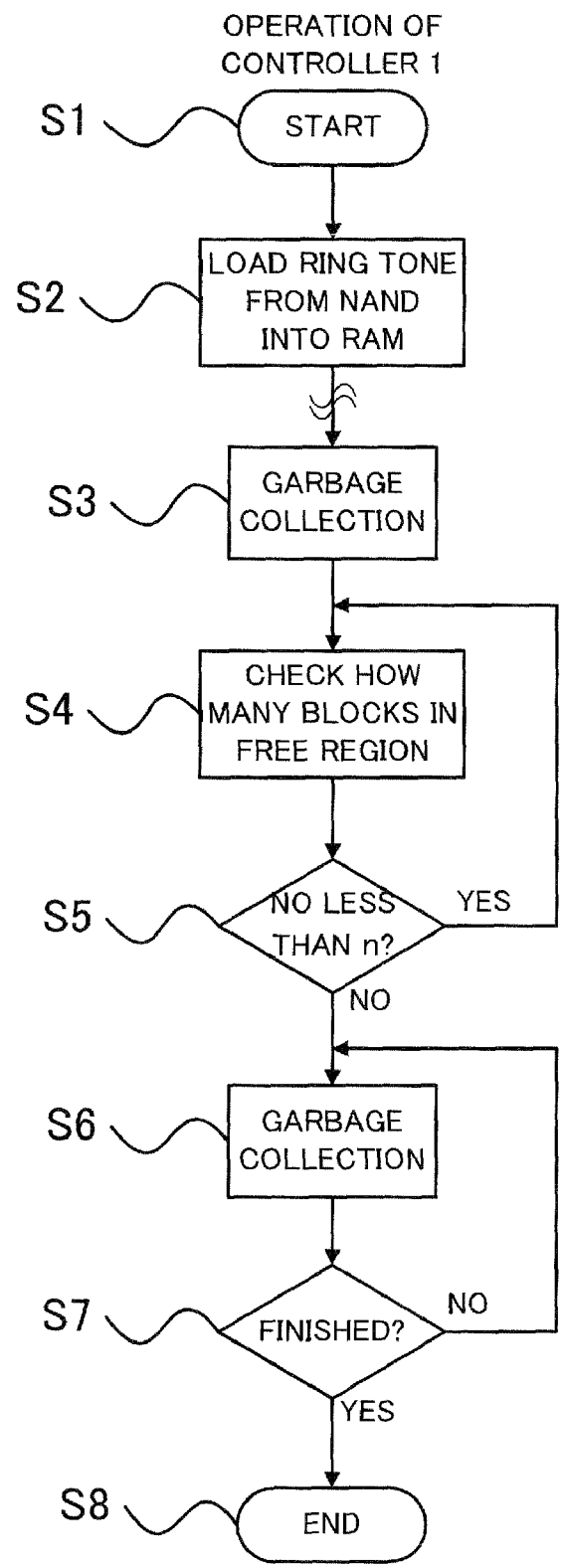
FIG. 2 is an operational flow chart of a controller included in the mobile communication apparatus of the embodiment.
Figure 3:
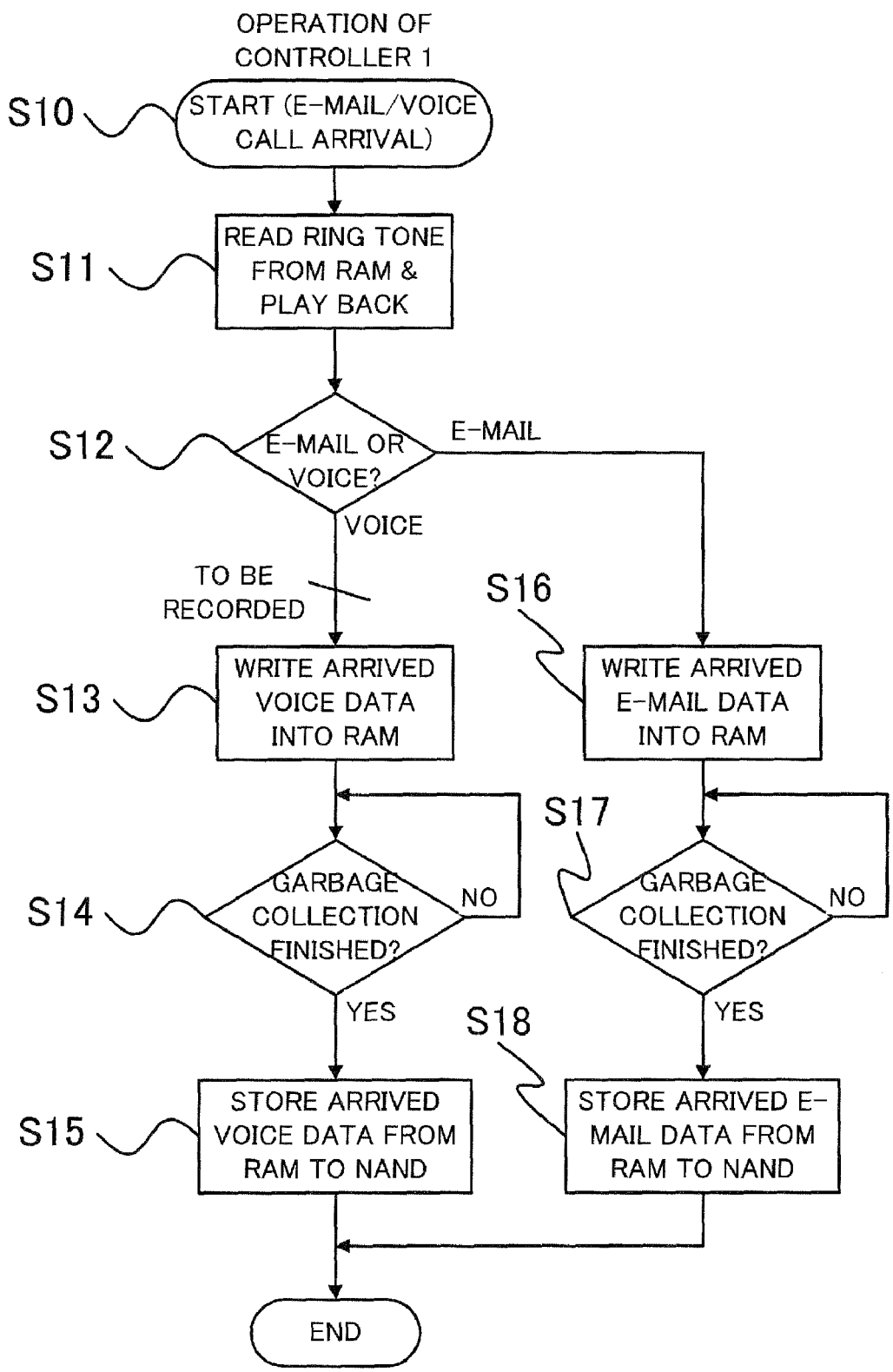
FIG. 3 is an operational flow chart for interrupt processing of the controller included in the mobile communication apparatus of the embodiment.

FIG. 2 is an operational flow chart of the controller 1 of the embodiment of the present invention. The controller 1 loads data of a ring tone into the RAM 10 before a timing of a forthcoming call arrival, e.g., just after the power is turned on (step S2). The controller 1 starts garbage collection at any timing (step S3).

While performing the garbage collection, the controller 1 checks how many blocks are in a free region of storage of the NAND 11 (step S4). The controller 1 determines if no less than n blocks are secured in the free region, where n is an integer and may be determined, e.g., according to a size of TV program data to be recorded so that the TV program data may be continuously recorded in the free region.

If no less than n blocks are secured at the step S4 ("YES" of step S5), the controller 1 does not perform garbage collection of the NAND 11. If less than n blocks are secured at the step S4, the controller 1 performs garbage collection of the NAND 11 so as to form a contiguous free region of storage (step S6). As the above process of the garbage collection at the step S6 requires a certain amount of time, the controller 1 checks if the garbage collection is finished (step S7) and ends the flow (step S8).

A flow of processing an interrupt which occurs at a timing during the steps S2-S8 described above and unexpected by a user of the mobile communication apparatus 100 will be described with reference to a next drawing. FIG. 3 is an operational flow chart for interrupt processing of the controller 1. An interrupt may be triggered by an e-mail or a voice call which arrives at a timing unexpected by the user, and may possibly conflict with the garbage collection being performed at the step S6 shown in FIG. 2.

If an interrupt occurs, triggered by an e-mail arrival or a voice call arrival, the controller 1 starts interrupt processing (step S10). In any case where an e-mail or a voice call has arrived, the controller 1 reads the data of the ring tone which has been loaded into the RAM 10 at the step S2 shown in FIG. 2 in order to ring, provides the audio interface 7 with the data of the ring tone and plays back the ring tone from the speaker 5 (step S11).

Although the step S11 may conflict with the step S6 shown in FIG. 2 where the garbage collection of the NAND 11 is being performed, not the NAND 11 but the RAM 10 is accessed at the step S11. Thus, the garbage collection of the NAND 11 at the step S6 and ordinary access to the storage devices of the mobile communication apparatus 100 may be performed without competition.

Then, the controller 1 checks by which kind of arrivals the interrupt has been triggered, an e-mail or a voice call (step S12). If a voice call has arrived and a message left on the built-in answering machine function is to be recorded, arrived voice data of the message are written into the RAM 10 (step S13).

Although the step S13 may conflict with the step S6 shown in FIG. 2 where the garbage collection of the NAND 11 is being performed, not the NAND 11 but the RAM 10 is accessed at the step S13. Thus, the garbage collection of the NAND 11 at the step S6 and ordinary access to the storage devices of the mobile communication apparatus 100 may be performed without competition.

Then, the controller 1 checks if the garbage collection (at the step S6 shown in FIG. 2) has been finished, or if the garbage collection is not being performed (step S14). If the garbage collection has been finished, or if the garbage collection is not being performed, the controller 1 stores the arrived voice data written into the RAM 10 at the step S13 to the NAND 11 (step S15), and ends the flow.

If an e-mail has arrived, arrived e-mail data are written into the RAM 10 (step S16). Although the step S16 may conflict with the step S6 shown in FIG. 2 where the garbage collection of the NAND 11 is performed, not the NAND 11 but the RAM 10 is accessed at the step S16. Thus, the garbage collection of the NAND 11 at the step S6 and ordinary access to the storage devices of the mobile communication apparatus 100 may be performed without competition.

Then, the controller 1 checks if the garbage collection (at the step S6 shown in FIG. 2) has been finished, or if the garbage collection is not being performed (step S17). If the garbage collection has been finished, or if the garbage collection is not being performed, the controller 1 stores the arrived e-mail data written into the RAM 10 at the step S16 to the NAND 11 (step S18), and ends the flow.

According to the embodiment of the present invention described above, the NAND 11 may be accessed without competition even if the garbage collection of the NAND 11 and the interrupt processing triggered by a voice call arrival or an e-mail arrival occurring at a timing unexpected by the user conflict with each other. Thus, there is no need to forbid one of the garbage collection of the NAND 11 and the interrupt processing, and operability of the mobile communication apparatus 100 may be improved thereby.

The interrupt may not be limited to voice call or e-mail arrivals but may be another process occurring at a timing unexpected by the user. The mobile communication apparatus 100 may be a mobile phone, a personal handy phone (PHS), a personal digital assistant (PDA), or another portable device having no radio functions.

Another way to avoid competition between garbage collection and interrupt processing may be that the mobile communication apparatus 100 refuses receiving an e-mail while performing the garbage collection, as the e-mail may be retrieved later from a server of a network. In a case of a voice call arrival, the mobile communication apparatus 100 may forbid recording messages left on the built-in answering machine function while performing the garbage collection.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A mobile communication apparatus configured to communicate with an opposite communication apparatus and configured with a built-in answering machine function, comprising:
    a transceiver configured to receive an incoming voice call arrival sent from the opposite communication apparatus, the transceiver configured to produce an interrupt signal upon receiving the incoming voice call arrival;
    a first memory device;
    a non-volatile second memory device;
    a controller connected to the transceiver, the first memory device and the second memory device, the controller configured to perform garbage collection of the second memory device, the controller configured to load data stored in one of the first memory device and the second memory device into the other of the first memory device and the second memory device, the controller further configured to perform an interrupt process upon receiving the incoming voice call arrival, the controller further configured to write data of a message left on the built-in answering machine function into the first memory device after the transceiver produces the interrupt signal, the controller further configured to load the data of the message stored in the first memory device into the second memory device except during the garbage collection,
    wherein the controller is configured to continue performing the garbage collection even while performing the interrupt process.

2. The mobile communication apparatus of claim 1, wherein:
    the transceiver is further configured to receive an incoming e-mail arrival and the transceiver is further configured to produce a second interrupt signal upon receiving the incoming email arrival;
    the controller is further configured to load ring tone data stored in the second memory device into the first memory device; and
    the controller is further configured to read the ring tone data from the first memory device upon the transceiver producing the second interrupt signal.

3. The mobile communication apparatus of claim 1, wherein:
    the incoming voice call arrival carries incoming data;
    the controller is further configured to write the incoming data into the first memory device after the transceiver produces the interrupt signal; and
    the controller is further configured to load the incoming data stored in the first memory device into the second memory device except during the garbage collection.

4. A method for avoiding a conflict between garbage collection and memory access of a mobile communication apparatus having a first memory device and a non-volatile second memory device, the mobile communication apparatus configured to communicate with an opposite communication apparatus and configured with a built-in answering machine function, comprising the steps of:
    receiving an incoming voice call arrival sent from the opposite communication apparatus;
    producing an interrupt signal upon receiving the incoming voice call arrival;
    performing garbage collection of the second memory device;
    loading data of a message left on the built-in answering machine function stored the first memory device into the second memory device; and
    performing an interrupt process upon receiving the incoming voice call arrival,
    wherein the performing of the garbage collection continues even while the interrupt process is performed.

5. The method of claim 4, further comprising:
    receiving an incoming e-mail arrival sent from the opposite communication apparatus;
    producing a second interrupt signal upon receiving the incoming e-mail arrival;
    loading ring tone data stored in the second memory device into the first memory device; and
    reading the ring tone data from the first memory device upon producing the second interrupt signal.

6. The method of claim 4, wherein:
    the incoming voice call arrival carries incoming data;
    performing an interrupt process includes writing the incoming data into the first memory device; and
    the incoming data is stored in the first memory device and loaded into the second memory device.

\* \* \* \* \*